US008770246B2

(12) United States Patent
Chaulet et al.

(10) Patent No.: US 8,770,246 B2
(45) Date of Patent: Jul. 8, 2014

(54) TIRE FOR HEAVY VEHICLES, WITH A CROWN REINFORCEMENT COMPRISING AT LEAST ONE LAYER OF CIRCUMFERENTIAL REINFORCING ELEMENTS

(75) Inventors: Christelle Chaulet, Clemont-Ferrand (FR); Richard Audigier, St-Laure (FR); Chris Boyer, Coumon d'Auvergne (FR)

(73) Assignees: Michelin Recherche et Technique S.A., Granges-Paccot (CH); Compagnie Generale des Etablissements Michelin, Clemont-Ferrand (FR)

( * ) Notice: Subject to any disclaimer, the term of this patent is extended or adjusted under 35 U.S.C. 154(b) by 265 days.

(21) Appl. No.: 13/140,733

(22) PCT Filed: Nov. 10, 2009

(86) PCT No.: PCT/EP2009/064916
§ 371 (c)(1),
(2), (4) Date: Sep. 2, 2011

(87) PCT Pub. No.: WO2010/069676
PCT Pub. Date: Jun. 24, 2010

(65) Prior Publication Data
US 2011/0308686 A1   Dec. 22, 2011

(30) Foreign Application Priority Data

Dec. 17, 2008   (FR) .................................. 08 58728

(51) Int. Cl.
*B60C 9/18* (2006.01)
*B60C 9/22* (2006.01)

(52) U.S. Cl.
USPC ............ 152/531; 152/526; 152/535; 152/538

(58) Field of Classification Search
None
See application file for complete search history.

(56) References Cited

U.S. PATENT DOCUMENTS

| | | | | |
|---|---|---|---|---|
| 5,205,881 A | * | 4/1993 | Kohno et al. | 152/527 |
| 6,367,527 B1 | * | 4/2002 | Cluzel | 152/527 |

FOREIGN PATENT DOCUMENTS

| | | | |
|---|---|---|---|
| EP | 1 559 588 | | 8/2005 |
| JP | 2-128904 | * | 5/1990 |
| JP | 3-21506 | * | 1/1991 |
| JP | 07 069005 | | 3/1995 |
| JP | 2008-105554 | * | 5/2008 |
| WO | WO 2005/016668 | | 2/2005 |
| WO | WO 2005/025895 | | 3/2005 |
| WO | WO 2008/050545 | | 5/2008 |

* cited by examiner

*Primary Examiner* — Justin Fischer
(74) *Attorney, Agent, or Firm* — Cozen O'Connor

(57) ABSTRACT

A tire comprising a crown reinforcement which is itself capped radially with a tread, the crown reinforcement containing at least one layer of circumferential reinforcing elements distributed axially at a variable pitch. The layer of circumferential reinforcing elements comprising five parts, these being a central part, two intermediate parts and two axially exterior parts, the pitch in the central part being in the range between 1 and 1.5 times the pitch of the axially exterior parts and the pitch in an intermediate part being in the range between 1.6 and 2 times the pitch of the axially exterior parts.

15 Claims, 2 Drawing Sheets

TIRE FOR HEAVY VEHICLES, WITH A CROWN REINFORCEMENT COMPRISING AT LEAST ONE LAYER OF CIRCUMFERENTIAL REINFORCING ELEMENTS

RELATED APPLICATION

This is a U.S. National Phase Application under 35 USC 371 of International Application PCT/EP 2009/064916, filed on Nov. 10, 2009.

This application claims the priority of French patent application no. 08/58728 filed Dec. 17, 2008. the entire content of which is hereby incorporated by reference.

FIELD OF THE INVENTION

The present invention relates to a tire with a radial carcass reinforcement, and more particularly to a tire intended to be fitted to vehicles that carry heavy loads, such as, for example, lorries, tractors, trailers, or road buses.

BACKGROUND OF THE INVENTION

The reinforcing structure or reinforcement of tires, particularly of tires for vehicles of the heavy vehicle type, is currently—and usually—made up of a stack of one or more plies conventionally known as "carcass plies", "crown plies", etc. This way of naming the reinforcements stems from the method of manufacture, which involves creating a series of semi-finished products in the form of plies, provided with thread-like reinforcements, often longitudinal, which are then assembled or stacked in order to build a green tire. The plies are produced flat, with substantial dimensions, and are then cut to the dimensions of a given product. The plies are also initially assembled substantially flat. The green tire thus produced is then shaped to adopt the toroidal profile typical of tires. The semi-finished "finishing" products are then applied to the green tire in order to obtain a product ready to be cured.

A "conventional" type of method such as this involves, particularly during the phase of manufacturing the green tire, the use of an anchoring element (generally a bead wire) which is used to anchor or retain the carcass reinforcement in the bead region of the tire. Thus, for this type of method, a portion of all the plies that make up the carcass reinforcement (or just some of them) is folded back around a bead wire positioned in the bead of the tire. That then anchors the carcass reinforcement in the bead.

The widespread use across industry of this conventional type of method, in spite of there being numerous variations in how the plies are created and assembled, has led those skilled in the art to adopt a vocabulary based on the method; hence the terminology generally used, involving in particular the terms "plies", "carcass", "bead wire", "shaping" to denote the transition from a flat profile to a toroidal profile, etc.

Nowadays there are tires which do not strictly speaking have "plies" or "bead wires" as understood from the above definitions. For example, document EP 0 582 196 describes tires manufactured without the aid of semi-finished products in the form of plies. For example, the reinforcing elements of the various reinforcing structures are applied directly to the adjacent layers of rubber compounds, everything being applied in successive layers to a toroidal core, the shape of which directly yields a profile similar to the final profile of the tire that is in the process of being manufactured. Thus, in this case, there are no longer any "semi-finished" products or "plies", or "bead wires". The basic products such as the rubber compounds and the reinforcing elements in the form of threads or filaments are applied directly to the core. As this core is of a toroidal shape, there is no longer any need to form the green tire in order to change from a flat profile to a profile in the form of a torus.

Furthermore, the tires described in that document do not use the "traditional" turning back of the carcass ply around a bead wire. That type of anchorage is replaced by an arrangement in which circumferential threads are positioned adjacent to the said sidewall reinforcing structure, everything being embedded in an anchoring or bonding rubber compound.

There are also methods of assembly on a toroidal core that employ semi-finished products specially designed for rapid, effective and simple laying onto a central core. Finally, it is also possible to use a hybrid comprising both certain semi-finished products for achieving certain architectural aspects (such as plies, bead wires etc.), while others are created by applying compounds and/or reinforcing elements directly.

In this document, in order to take account of recent technological advances both in the field of manufacture and in the design of the products, the conventional terms such as "plies", "bead wires", etc., are advantageously replaced by terms which are neutral or independent of the type of method used. Hence, the term "carcass type reinforcement" or "sidewall reinforcement" can validly be used to denote the reinforcing elements of a carcass ply in the conventional method, and the corresponding reinforcing elements, generally applied to the sidewalls, of a tire produced according to a method that does not involve semi-finished products. The term "anchoring zone" for its part, can just as easily denote the "traditional" turning back of the carcass ply around a bead wire in a conventional method as it can the assembly formed by the circumferential reinforcing elements, the rubber compound and the adjacent sidewall reinforcing portions of a bottom region created using a method which involves applying elements to a toroidal core.

In general, in tires of the heavy vehicle tire type, the carcass reinforcement is anchored on each side in the region of the bead and is surmounted radially by a crown reinforcement, constituted by at least two layers that are superposed and formed of threads or cords which are parallel within each layer and crossed from one layer to the next making with the circumferential direction angles comprised between 10° and 45°. The said working layers, that form the working reinforcement, may also be covered by at least one so-called protective layer formed of reinforcing elements, which are advantageously metal and extensible, known as elastic reinforcing elements. It may also comprise a layer of metal cords or threads with low extensibility, that make an angle comprised between 45° and 90° with the circumferential direction, this ply, known as a bracing ply, being situated radially between the carcass reinforcement and the first so-called working crown ply, formed of parallel cords or threads at angles of at most 45° in terms of absolute value. The bracing ply forms, with at least the said working ply, a triangulated reinforcement which, under the various stresses that it experiences, undergoes very little deformation, the essential role of the bracing ply being to react transverse compressive forces to which all of the reinforcing elements are subjected in the region of the crown of the tire.

In the case of heavy vehicle tires, a single protective layer is usually present and its protective elements are, mostly, oriented in the same direction and at the same angle in terms of absolute value as those of the reinforcing elements of the radially outermost and therefore radially adjacent working layer. In the case of engineering works vehicle tires intended to run on somewhat uneven ground, the presence of two protective layers is advantageous, the reinforcing elements being crossed from one layer to the next and the reinforcing elements of the radially interior protective layer being crossed with the inextensible reinforcing elements of the working layer that is radially exterior and adjacent to the said radially interior protective layer.

Cords are said to be inextensible when the said cords have, under a tensile force equal to 10% of the breaking strength, a relative elongation of 0.2% at most.

Cords are said to be elastic when the said cords have, under a tensile force equal to the breaking strength, a relative elongation at least equal to 3% with a maximum tangent modulus of less than 150 GPa.

Circumferential reinforcing elements are reinforcing elements which make, with the circumferential direction, angles comprised in the range +2.5°, −2.5° about 0°.

The circumferential direction of the tire, or longitudinal direction, is the direction corresponding to the periphery of the tire and defined by the direction in which the tire runs.

The transverse or axial direction of the tire is parallel to the axis of rotation of the tire.

The radial direction is a direction that intersects the axis of rotation of the tire and is perpendicular thereto.

The axis of rotation of the tire is the axis about which it revolves under normal use.

A radial or meridian plane is a plane containing the axis of rotation of the tire.

The circumferential median plane or equatorial plane is a plane perpendicular to the axis of rotation of the tire and which divides the tire into two halves.

What is meant by the "elastic modulus" of a rubber compound is a secant tensile modulus at 10% deformation and ambient temperature.

As far as the rubber compounds are concerned, modulus measurements are carried out under tension in accordance with AFNOR-NFT-46002, September 1988: the nominal secant modulus (or apparent stress, in MPa) is measured in second elongation (i.e. after an accommodating cycle) at 10% elongation (standard temperature and hygrometry conditions in accordance with AFNOR-NFT-40101, December 1979).

As far as the metal threads or cords are concerned, the measurements of load at break (maximum load in N), strength at break (in MPa) and elongation at break (total elongation in %) are performed under tension in accordance with ISO 6892, 1984.

Some present-day tires, known as "road" tires, are intended to run at high speed and over increasingly long distances, because of the improvements to the road network and the expansion of the motorway network worldwide. Although all of the conditions under which a tire is called upon to run undoubtedly allows an increase in the number of kilometers covered, because tire wear is lower, this is at the expense of tire durability, particularly of crown reinforcement durability.

The issue is that there are stresses in the crown reinforcement and more particularly shear stresses between the crown layers, combined with a not insignificant increase in operating temperature at the ends of the axially shortest crown layer, which result in the appearance and propagation of cracks in the rubber at the said ends. The same problem exists in the case of edges of two layers of reinforcing elements, the said other layer not necessarily being radially adjacent to the first.

To improve the endurance of the crown reinforcement of the type of tire being studied, solutions relating to the structure and quality of the layers and/or profiles of rubber compounds which are positioned between and/or around the ends of plies and, more particularly, the ends of the axially shortest ply, have already been applied.

Patent FR 1 389 428, in order to increase the resistance to damage of the rubber compound situated near the edges of the crown reinforcement, recommends the use, in combination with a low-hysteresis tread, of a rubber profile covering at least the sides and the marginal edges of the crown reinforcement and consisting of a low-hysteresis rubber compound.

Patent FR 2 222 232, in order to avoid separation between crown reinforcement plies, teaches the coating of the ends of the reinforcement in a rubber mat, the Shore A hardness of which differs from that of the tread surmounting the said reinforcement, and is higher than the Shore A hardness of the profile of rubber compound positioned between the edges of crown reinforcing plies and carcass reinforcement.

French application FR 2 728 510 proposes positioning, on the one hand, between the carcass reinforcement and the crown reinforcement working ply radially closest to the axis of rotation, an axially continuous ply formed of inextensible metal cords that make an angle of at least 60° with the circumferential direction and the axial width of which is at least equal to the axial width of the shortest working crown ply and, on the other hand, between the two working crown plies, an additional ply formed of metal elements directed substantially parallel to the circumferential direction.

Prolonged running of the tires thus constructed under particularly harsh conditions has revealed limits in terms of the endurance of these tires.

To remedy such disadvantages and improve the endurance of the crown reinforcement of these tires, it has been proposed that there be associated with the angle working crown layers at least one additional layer of reinforcing elements substantially parallel to the circumferential direction. French application WO 99/24269 proposes, notably, on each side of the equatorial plane and in the immediate axial continuation of the additional ply of reinforcing elements substantially parallel to the circumferential direction, that the two working crown plies formed of reinforcing elements that are crossed from one ply to the next be coupled over a certain axial distance and then decoupled by profiles of rubber compound at least over the remainder of the width common to the said two working plies.

The layer of circumferential reinforcing elements usually consists of at least one metal cord wound to form a spiral laid at an angle of less than 8° with respect to the circumferential direction. The cords initially manufactured are coated with a rubber compound before being laid. This rubber compound then penetrates the cord under the effect of the pressure and the temperature when the tire is cured. The coating of the cords with the rubber compound may be performed in an intermediate phase between manufacturing the cord and laying it to be stored in the form of a reel. An alternative form of manufacture is to coat the cords with the rubber compound at the same time as or, more precisely, just before, the said cords are laid.

The results obtained in terms of endurance and wear during prolonged running on high-speed routes are mostly satisfactory. Nonetheless, it has emerged that under certain running conditions, some tires exhibit more pronounced wear on one part of their tread, in particular the centre. This phenomenon becomes more pronounced as the width of the tread increases.

SUMMARY OF THE INVENTION

It is an object of the invention to provide tires for "heavy vehicles", the endurance and wear performance of which is maintained for road use, whatever the conditions of use.

This object is achieved, according to one aspect of the invention, by a tire with a radial carcass reinforcement comprising a crown reinforcement formed of at least two working crown layers of inextensible reinforcing elements, crossed from one layer to the other making angles of between 10° and 45° with the circumferential direction, itself radially capped by a tread, the said tread being connected to two beads via two sidewalls, the crown reinforcement comprising at least one layer of circumferential reinforcing elements distributed axially at a variable pitch, the layer of circumferential reinforcing elements consisting of at least five parts these being a central part, two intermediate parts and two axially exterior parts, the pitch in the central part being in the range between 1 and 1.5 times the pitch of the axially exterior parts and the pitch in an intermediate part being in the range between 1.6 and 2 times the pitch of the axially exterior parts.

Within the meaning of the invention, the pitch in part of the layer of circumferential reinforcing elements is the distance between two consecutive reinforcing elements. It is measured between the longitudinal axes of the said reinforcing elements in a direction perpendicular to at least one of the said longitudinal axes. It is therefore measured in a substantially axial direction.

The tire according to an embodiment of the invention has a layer of circumferential reinforcing elements distributed at a variable pitch leading to a layer that has a rigidity in the circumferential direction, or circumferential rigidity, which varies in the axial direction. According to the invention, the layer of circumferential reinforcing elements has a rigidity in the circumferential direction which is greater at the axial ends of the said layer than it is at the centre. Furthermore, the circumferential rigidity of the said layer of circumferential reinforcing elements decreases from one axial end to an intermediate region, then increases again from this intermediate region to the central part of the said layer.

The tire according to an embodiment of the invention thus advantageously has a layer of circumferential reinforcing elements which has a circumferential rigidity that is lower at the crown of the tire than the circumferential rigidity at the ends of the said layer of circumferential reinforcing elements.

The rigidity of the central part of the layer of circumferential reinforcing elements remains sufficient to provide the tire with sufficient belting in this central part such that the tire is able to withstand the stresses applied particularly during inflation or when running at high speed, and to limit the circumferential expansion of the crown reinforcement.

Advantageously according to an embodiment of the invention, the pitch in the central part is greater than 1.1 times the pitch of the axially exterior parts.

Tests have demonstrated that such a tire thus defined according to the invention maintains satisfactory endurance properties and also exhibits even resistance to wear across the width of the tread, irrespective of the conditions of use.

Furthermore, it has become apparent that the tire thus defined according to the invention has improved properties over known tires in terms of resistance to attack when the said tires have, for example, to run on ground that is not paved with asphalt.

The inventors have in fact been able to demonstrate that the attacks that occur on land that is not paved with asphalt essentially affect the central part of the tread of the tire, the latter seemingly always being the most exposed.

The tire as defined according to the invention leads to a softening in the radial direction of the axially central part of the tire because in particular the low rigidity of the layer of circumferential reinforcing elements in the central zone of the tire tread. This softening leads, in view of the results obtained, to the tread absorbing the attacks from obstacles such as stones present on the ground over which the vehicle is driving.

Other advantages of a tire according to the invention as compared with a tire comprising a layer of circumferential reinforcing elements distributed at a constant pitch across the entire axial width of the said layer are, firstly, its weight and, secondly, its cost of manufacture. Because the structure of the tire according to the invention is lightened by comparison with that of a customary tire comprising a layer of circumferential reinforcing elements distributed at a constant pitch, the weight of the tire according to the invention is lower than that of the conventional tire. Specifically, the spacing or pitch between the reinforcing elements of a conventional tire comprising a layer of circumferential reinforcing elements distributed at a constant pitch is defined on the basis of the minimum pitch needed to meet the various acceptance standards for the marketing of tires. The tire according to the invention therefore enjoys a reduction in the amount of material needed to produce the layer of circumferential reinforcing elements.

Likewise, the cost of materials for manufacturing a tire according to the invention is lower than that of a tire comprising a layer of circumferential reinforcing elements distributed at a constant pitch because the amount of material needed to produce the layer of circumferential reinforcing elements is lower. Furthermore, for the same reasons, the time taken to manufacture the layer of circumferential reinforcing elements of the tire according to the invention is lower by comparison with the time taken to manufacture a layer of circumferential reinforcing elements distributed at a constant pitch.

According to an advantageous alternative form of embodiment of the invention, the layer of circumferential reinforcing elements has an axial width greater than $0.5 \times S$.

S is the maximum axial width of the tire when the latter is mounted on its service rim and inflated to its recommended pressure.

The axial widths of the layers of reinforcing elements are measured on a cross section of a tire, the tire therefore being in an uninflated state.

According to a preferred embodiment of the invention, the axial width of the central part of the layer of circumferential reinforcing elements is in the range between 30 and 40% of the axial width of the layer of circumferential reinforcing elements. The inventors consider that, in such a region, the density of circumferential reinforcing elements is such as defined according to the invention and particularly no lower in order to provide satisfactory belting of the tire in this central part in order to be able to withstand the stresses imposed particularly during inflation or when running at high speed.

For preference also according to an embodiment of the invention, the axial width of each of the axially exterior parts of the layer of circumferential reinforcing elements is in the range between 7 and 15% of the axial width of the layer of circumferential reinforcing elements. The inventors have been able to demonstrate that, in the intermediate regions thus defined, the density of circumferential reinforcing elements could be reduced as defined in the invention without adversely affecting tire performance.

According to an embodiment of the invention, the axial width of each of the intermediate parts of the layer of circumferential reinforcing elements is in the range between 15 and 30% of the axial width of the layer of circumferential reinforcing elements.

An embodiment of the invention advantageously provides for the distribution of pitch lengths of the layer of circumferential reinforcing elements to be symmetric about the equatorial plane of the tire.

Advantageously too, the layer of circumferential reinforcing elements is centered on the crown of the tire. The distribution of the regions is thus symmetric about the equatorial plane of the tire. The distribution of the circumferential reinforcing elements is therefore also symmetric in the axial direction about the equatorial plane of the tire.

Another embodiment of the invention has it that at least one layer that makes up the crown architecture is present radially under the axially outermost "rib" or chiefly longitudinally directed pattern. This embodiment, as previously mentioned, improves the rigidity of the said pattern. Advantageously also, the layer of circumferential reinforcing elements is present radially under the axially outermost "rib" or chiefly longitudinally directed pattern.

According to a preferred embodiment of the invention, at least two working crown layers have different axial widths, the difference between the axial width of the axially widest working crown layer and the axial width of the axially least wide working crown layer being comprised between 10 and 30 mm.

Preferably too, the axially widest working crown layer is radially on the interior of the other working crown layers.

According to a preferred embodiment of the invention, the layer of circumferential reinforcing elements is positioned radially between two working crown layers.

Advantageously too according to an embodiment of the invention, the axial widths of the working crown layers radially adjacent to the layer of circumferential reinforcing elements are greater than the axial width of the said layer of circumferential reinforcing elements and, for preference, the said working crown layers adjacent to the layer of circumferential reinforcing elements are on each side of the equatorial plane and in the immediate axial continuation of the layer of circumferential reinforcing elements coupled over an axial width in order thereafter to be decoupled by profiles of rubber compound at least over the remainder of the width common to the said two working layers.

Within the meaning of the invention, coupled layers are layers the respective reinforcing elements of which are radially separated by 1.5 mm at most, the said thickness of rubber being measured radially between the respectively upper and lower generatrices of the said reinforcing elements.

The presence of such couplings between the working crown layers adjacent to the layer of circumferential reinforcing elements allows a reduction in the tensile stresses acting on the axially outermost circumferential elements situated closest to the coupling.

The thickness of the inter-working ply decoupling profiles, measured in line with the ends of the least wide working ply, will be equal to at least two millimeters and preferably greater than 2.5 mm.

According to an advantageous embodiment of the invention, the reinforcing elements of at least one layer of circumferential reinforcing elements are metal reinforcing elements with a secant modulus at 0.7% elongation comprised between 10 and 120 GPa and a maximum tangent modulus of less than 150 GPa.

According to a preferred embodiment, the secant modulus of the reinforcing elements at 0.7% elongation is less than 100 GPa, and greater than 20 GPa, preferably comprised between 30 and 90 GPa and more preferably still less than 80 GPa.

Again as a preference, the maximum tangent modulus of the reinforcing elements is less than 130 GPa and preferably less than 120 GPa.

The moduli expressed hereinabove are measured on a curve of tensile stress as a function of elongation determined with a preload of 20 MPa brought down to the cross section of metal of the reinforcing element, the tensile stress corresponding to a measured tension brought down to the cross section of metal of the reinforcing element.

The moduli of the same reinforcing elements can be measured on a curve of tensile stress as a function of elongation determined with a preload of 10 Mpa brought down to the overall cross section of the reinforcing element, the tensile stress corresponding to a measured tension brought down to the overall cross section of the reinforcing element. The overall cross section of the reinforcing element is the cross section of a composite element made of metal and of rubber, the latter notably having penetrated the reinforcing element during the tire curing phase.

According to this formulation, relating to the overall cross section of the reinforcing element, the reinforcing elements of the axially exterior parts and of the central part of at least one layer of circumferential reinforcing elements are metal reinforcing elements with a secant modulus at 0.7% elongation comprised between 5 and 60 GPa with a maximum tangent modulus of less than 75 GPa.

According to a preferred embodiment, the secant modulus of the reinforcing elements at 0.7% elongation is less than 50 GPa and greater than 10 GPa, preferably comprised between 15 and 45 GPa and more preferably still, less than 40 GPa.

Preferably also, the maximum tangent modulus of the reinforcing elements is less than 65 GPa and more preferably still, less than 60 GPa.

According to a preferred embodiment, the reinforcing elements of at least one layer of circumferential reinforcing elements are metal reinforcing elements having a curve of tensile stress as a function of relative elongation with shallow gradients for short elongations and a substantially constant and steep gradient for higher elongations. Such reinforcing elements of the additional ply are usually known as "bi-modulus" elements.

According to a preferred embodiment of the invention, the substantially constant and steep gradient appears from above a relative elongation comprised between 0.1% and 0.5%.

The various abovementioned characteristics of the reinforcing elements are measured on reinforcing elements taken from tires.

Reinforcing elements more particularly suited to creating at least one layer of circumferential reinforcing elements according to the invention are, for example, assemblies of the formula 21.23, the construction of which is 3×(0.26+6×0.23) 4.4/6.6 SS; this stranded cord being made up of 21 elementary threads of formula 3×(1+6), with 3 twisted-together strands each made up of 7 threads, one thread forming a central core of a diameter equal to 26/100 mm, and 6 wound threads of diameter equal to 23/100 mm. A cord such as this has a secant modulus at 0.7% equal to 45 GPa and a maximum tangent modulus equal to 98 GPa, measured on a curve of tensile stress as a function of elongation determined with a preload of 20 MPa brought down to the cross section of metal of the reinforcing element, the tensile stress corresponding to a measured tension brought down to the cross section of metal of the reinforcing element. On a curve of tensile stress as a function of elongation determined with a preload of 10 MPa brought down to the overall cross section of the reinforcing element, the tensile stress corresponding to a measured tension brought down to the overall cross section of the reinforcing element, this cord of formula 21.23 has a secant modulus at 0.7% equal to 23 GPa and a maximum tangent modulus equal to 49 GPa.

Likewise, another example of reinforcing elements is an assembly of formula 21.28, the construction of which is 3×(0.32+6×0.28)6.2/9.3 SS. This cord has a secant modulus at 0.7% equal to 56 GPa and a maximum tangent modulus equal to 102 GPa, both measured on a curve of tensile stress as a function of elongation determined with a preload of 20 MPa brought down to the cross section of metal of the reinforcing element, the tensile stress corresponding to a measured tension brought down to the cross section of metal of the reinforcing element. On a curve of tensile stress as a function of elongation determined with a preload of 10 MPa brought down to the total cross section of the reinforcing element, the tensile stress corresponding to a measured tension brought down to the overall cross section of the reinforcing element, this cord of formula 21.28 has a secant modulus of 0.7% equal to 27 GPa and a maximum tangent modulus equal to 49 GPa.

The use of such reinforcing elements in at least one layer of circumferential reinforcing elements makes it possible in particular to maintain satisfactory layer rigidities even after the shaping and curing steps in conventional manufacturing methods.

According to a second embodiment of the invention, the circumferential reinforcing elements may be formed of inextensible metal elements cut in such a way as to form portions of a length very much shorter than the circumference of the least long layer, but preferably greater than 0.1 times the said circumference, the cuts between portions being axially offset from one another. Preferably also, the elastic modulus in tension per unit width of the additional layer is less than the elastic modulus in tension, measured under the same conditions, of the most extensible working crown layer. An embodiment such as this makes it possible, in a simple way, to give the layer of circumferential reinforcing elements a modulus that can easily be adjusted (through the choice of spacing between portions of one and the same row), but which is in all cases lower than the modulus of the layer made up of the same metal elements but continuous ones, the modulus of the additional layer being measured on a vulcanized layer of cut elements taken from the tire.

According to a third embodiment of the invention, the circumferential reinforcing elements are wavy metal reinforcing elements, the ratio a/λ of the amplitude of the wave to the wavelength being at most equal to 0.09. For preference, the elastic modulus in tension per unit width of the additional layer is less than the elastic modulus in tension, measured under the same conditions, of the most extensible working crown layer.

The metal elements are preferably steel cords.

According to an embodiment of the invention, in order to reduce the tensile stresses acting on the axially outermost circumferential elements, the angle formed with the circumferential direction by the reinforcing elements of the working crown layers is less than 30° and preferably less than 25°.

According to another advantageous alternative form of embodiment of the invention, the working crown layers comprise reinforcing elements that are crossed from one ply to the other, making with the circumferential direction angles that vary according to the axial direction, the said angles being greater on the axially outer edges of the layers of reinforcing elements with respect to the angles of the said elements measured at the circumferential mid-plane. Such an embodiment of the invention makes it possible to increase the circumferential rigidity in certain zones while on the other hand reducing it in others, notably in order to reduce the compression of the carcass reinforcement.

A preferred embodiment of the invention also has it that the crown reinforcement is supplemented radially on the outside by at least one additional ply, known as a protective ply, of so-called elastic reinforcing elements, oriented with respect to the circumferential direction at an angle comprised between 10° and 45° and of the same direction as the angle formed by the inextensible elements of the working ply radially adjacent to it.

The protective layer may have an axial width smaller than the axial width of the least wide working layer. The said protective layer may also have an axial width greater than the axial width of the least wide working layer, such that it overlaps the edges of the least wide working layer and, when it is the radially uppermost layer that is the least wide, such that it is coupled, in the axial continuation of the additional reinforcement, with the widest working crown layer over an axial width in order thereafter, axially on the exterior, to be decoupled from the said widest working layer by profiles at least 2 mm thick. The protective layer formed of elastic reinforcing elements may, in the abovementioned case, on the one hand, possibly be decoupled from the edges of the said least wide working layer by profiles of a thickness appreciably smaller than the thickness of the profiles that separate the edges of the two working layers and, on the other hand, have an axial width less than or greater than the axial width of the widest crown layer.

According to any one of the aforementioned embodiments of the invention, the crown reinforcement may also be supplemented, radially on the inside between the carcass reinforcement and the radially inner working layer closest to the said carcass reinforcement, by a bracing layer of inextensible metal reinforcing elements made of steel that make an angle greater than 60° with the circumferential direction in the same direction as the angle formed by the reinforcing elements of the radially closest carcass reinforcement layer.

BRIEF DESCRIPTION OF THE DRAWINGS

Other details and advantageous features of the invention will emerge hereinafter from the description of some exemplary embodiments of the invention, with reference to FIGS. 1 and 2 which depict.

DETAILED DESCRIPTION OF THE DRAWINGS

In order to make them easier to understand, the figures are not drawn to scale. The figures depict only half a view of a tire which continues symmetrically with respect to the axis XX' which represents the circumferential mid-plane or equatorial plane of a tire.

Figure 1:
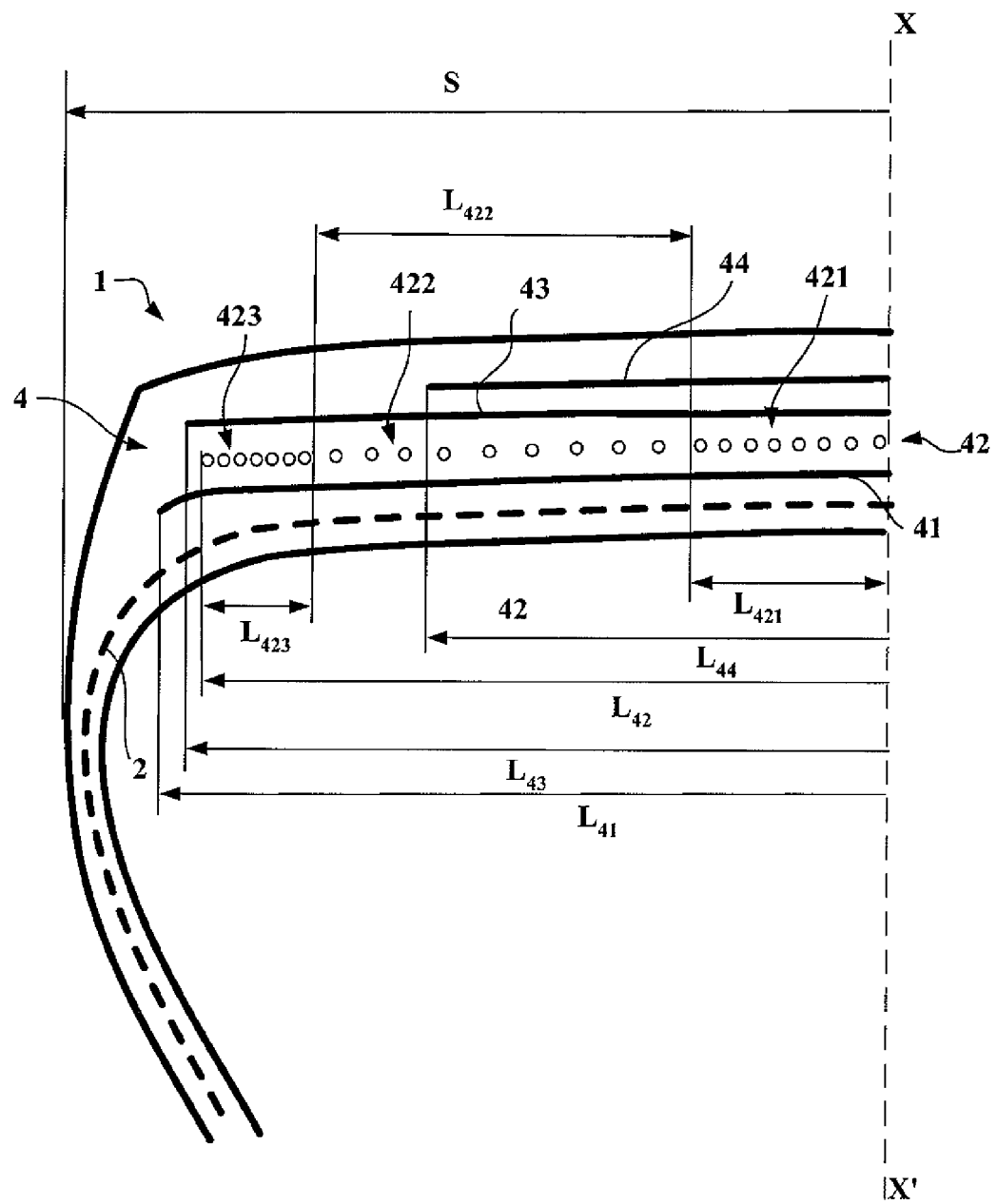
FIG. 1: a meridian view of a diagram of a tire according to one embodiment of the invention.

In FIG. 1, the tire 1, of the size 315/70 R 22.5, has an aspect ratio H/S equal to 0.70, H being the height of the tire 1 on its mounting rim and S is the maximum axial width. The said tire 1 comprises a radial carcass reinforcement 2 anchored in two beads, not depicted in the figure. The carcass reinforcement is formed of a single layer of metal cords. This carcass reinforcement 2 is belted by a crown reinforcement 4, formed radially from the inside outwards:

of a first working layer 41 formed of unbelted inextensible 11.35 metal cords which are continuous across the entire width of the ply and directed at an angle equal to 18°, of a layer of circumferential reinforcing elements 42 formed of steel 21×28 metal cords, of "bi-modulus" type, made up of five parts these being a central part 421, two axially exterior parts 423 and two intermediate parts 422, of a second working layer 43 formed of unbelted inextensible 11.35 metal cords which are continuous across the entire width of the ply, directed at an angle of 18° and crossing with the metal cords of the layer 41, of a protective layer 44 formed of 6×35 elastic metal cords.

The crown reinforcement is itself capped by a tread 6.

The maximum axial width S of the tire is equal to 319 mm.

The axial width $L_{41}$ of the first working layer 41 is equal to 260 mm.

The axial width $L_{43}$ of the second working layer 43 is equal to 245 mm.

The axial width $L_{42}$ of the layer of circumferential reinforcing elements 42, it is equal to 198 mm.

The axial width $L_{421}$ of the central part 421 is equal to 33 mm. In this central part 421, the pitch between the circumferential reinforcing elements is equal to 2.8 mm. The ratio of twice the axial width $L_{421}$ to the axial width $L_{42}$ is close to 33% and therefore is in the range between 30 and 40%.

The axial width $L_{423}$ of each of the axially exterior parts 423 is equal to 24 mm. In these axially exterior parts 423, the pitch between the circumferential reinforcing elements is equal to 1.9 mm. The ratio of the axial width $L_{423}$ to the axial width $L_{42}$ is close to 12% and therefore is in the range between 7 and 15%.

The axial width $L_{422}$ of each of the intermediate parts 422 is equal to 42 mm. In these intermediate parts 422, the pitch between the circumferential reinforcing elements is equal to 3.3 mm. The ratio of the axial width $L_{422}$ to the axial width $L_{42}$ is close to 21% and therefore is in the range between 15 and 30%.

The ratio of the pitch in the central part to the pitch of the axially exterior parts is equal to 1.47 and therefore in the range between 1 and 1.5.

The ratio of the pitch in the intermediate parts to the pitch of the axially exterior parts is equal to 1.74 and therefore in the range between 1.6 and 2.

The final crown ply 44 known as the protective ply has a width $L_{44}$ equal to 180 mm.

Figure 2:
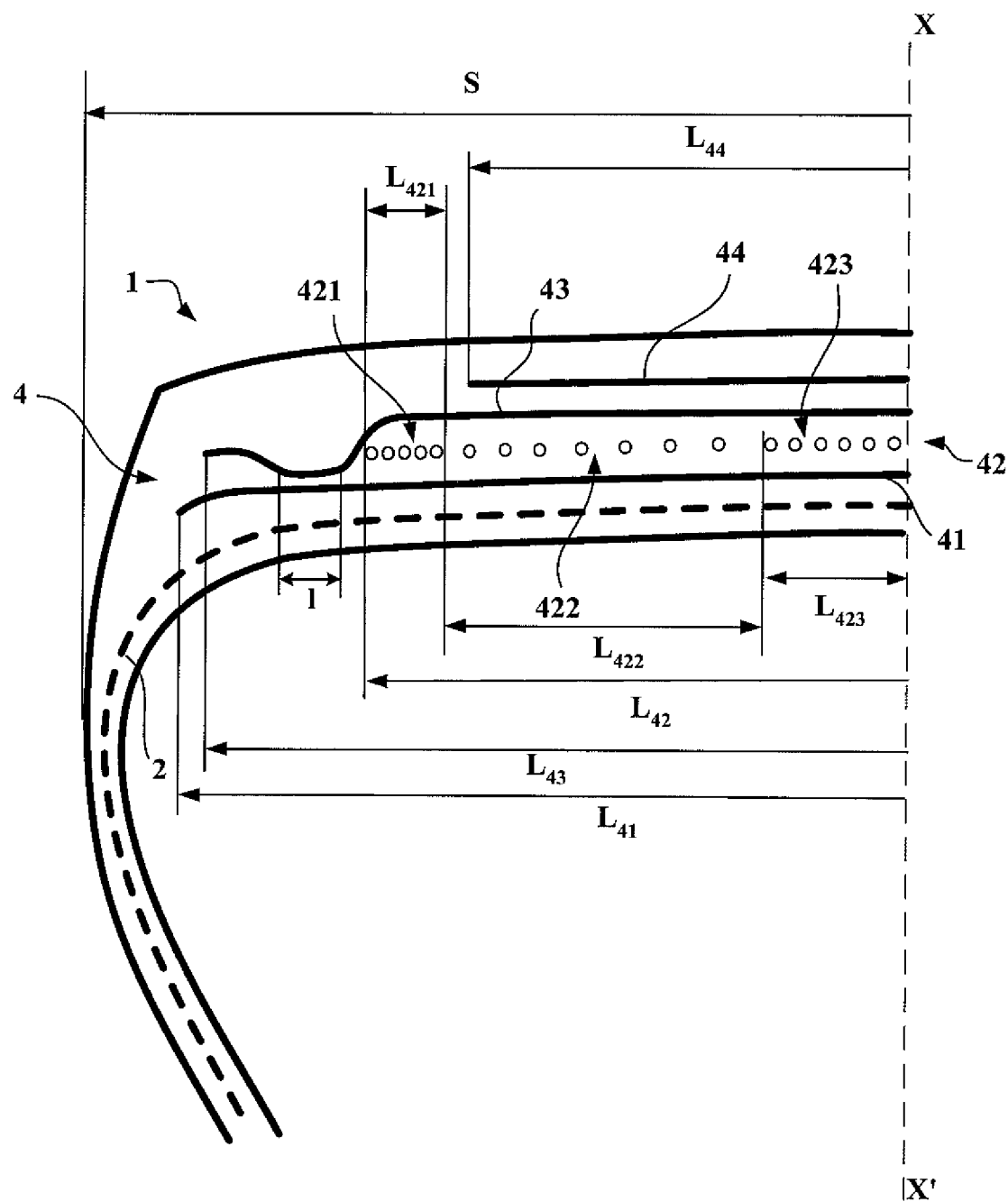
FIG. 2: a meridian view of a diagram of a tire according to a second embodiment of the invention.

In FIG. 2, the tire 1 differs from the one depicted in FIG. 1 in that the two working layers 41 and 43 are, on each side of the equatorial plane and axially in the continuation of the layer of circumferential reinforcing elements 42, coupled over an axial width 1. Over the remaining width common to the two working layers, the two working layers 41, 43 are separated by a rubber profile, not depicted in the figure, the thickness of the said profile increasing from the axial end of the coupling zone towards the end of the least wide working layer. The said profile advantageously is wide enough radially to overlap the end of the widest working layer 41 which, in this case, is the working layer radially closest to the carcass reinforcement.

Tests have been conducted on the tire produced according to the invention in accordance with the depiction of FIG. 1 and compared against a reference tire that was identical, but produced with a conventional configuration.

This reference tire comprised a layer of circumferential reinforcing elements of the same width as that of the tire produced in accordance with the invention but in which the pitch between the circumferential reinforcing elements was constant along its entire width.

First endurance tests were conducted by fitting identical vehicles with each of the tires and having each of the vehicles drive a route in a straight line, the tires being subjected to loads in excess of the nominal load in order to accelerate this type of test.

The vehicles were associated with a load per tire of 4000 kg.

Other endurance tests were conducted on a test rig that imposed a load and a side slip angle on the tires. The tests were conducted on the tires according to the invention with the same load and the same side slip angle as those applied to the reference tires.

The tests thus conducted demonstrated that the distances covered in each of these tests was substantially identical for the tires according to the invention and for the reference tires. It would therefore appear that the tires according to the invention have substantially equivalent performance to the reference tires in terms of endurance.

Finally, other running tests were performed on ground unpaved with asphalt with reliefs to simulate the presence of stones particularly harmful to tire treads.

These last tests demonstrated that after covering identical distances, the tires according to the invention displayed less severe damage than the reference tires the damage to which was considered so great as to prohibit further use of the reference tires.

Furthermore, the manufacture of the tire produced according to the invention as compared with that of the reference tire shows a saving in terms of weight and in terms of costs by comparison with the reference tire, bearing in mind firstly the cost of the materials and, more specifically, the cost of the cord used to form the layer of circumferential reinforcing elements, and secondly, the cost of manufacture associated with the method and more specifically with the laying of the circumferential reinforcing elements.

The invention claimed is:

1. A tire with a radial carcass reinforcement comprising a crown reinforcement formed of at least two working crown layers of inextensible reinforcing elements, crossed from one layer to the other making angles of between 10° and 45° with the circumferential direction, itself radially capped by a tread, the tread being connected to two beads via two sidewalls, the crown reinforcement comprising at least one layer of circumferential reinforcing elements distributed axially at a variable pitch, wherein the layer of circumferential reinforcing elements comprises five parts, these being a central part, two intermediate parts and two axially exterior parts, wherein the pitch in the central part is in the range between 1 and 1.5 times the pitch of the axially exterior parts and wherein the pitch in an intermediate part is in the range between 1.6 and 2 times the pitch of the axially exterior parts, wherein the axial width of the central part of the layer of circumferential reinforcing elements is in the range between 30 and 40% of the axial width of the layer of circumferential reinforcing elements.

2. The tire according to claim 1, wherein the axial width of each of the axially exterior parts of the layer of circumferential reinforcing elements is in the range between 7 and 15% of the axial width of the layer of circumferential reinforcing elements.

3. The tire according to claim 1, wherein the axial width of each of the intermediate parts of the layer of circumferential reinforcing elements is in the range between 15 and 30% of the axial width of the layer of circumferential reinforcing elements.

4. The tire according to claim 1, wherein the distribution of pitch lengths in the layer of circumferential reinforcing elements is symmetric about the equatorial plane of the tire.

5. The tire according to claim 1, wherein the layer of circumferential reinforcing elements is positioned radially between two working crown layers.

6. The tire according to claim 1, at least two working crown layers having different axial widths, wherein the difference between the axial width of the axially widest working crown layer and the axial width of the axially least wide working crown layer is comprised between 10 and 30 mm.

7. The tire according to claim 6, wherein the axially widest working crown layer is radially on the interior of the other working crown layers.

8. The tire according to claim 1, wherein the axial widths of the working crown layers radially adjacent to the layer of circumferential reinforcing elements are greater than the axial width of the said layer of circumferential reinforcing elements.

9. The tire according to claim 8, wherein the working crown layers adjacent to the layer of circumferential reinforcing elements are on each side of the equatorial plane and in the immediate axial continuation of the layer of circumferential reinforcing elements coupled over an axial width in order thereafter to be decoupled by profiles of rubber compound at least over the remainder of the width common to the two working layers.

10. The tire according to claim 1, wherein he reinforcing elements of at least one layer of circumferential reinforcing elements are metal reinforcing elements with a secant modulus at 0.7% elongation comprised between 10 and 120 GPa and a maximum tangent modulus of less than 150 GPa.

11. The tire according to claim 1, wherein the reinforcing elements of at least one layer of circumferential reinforcing elements are metal reinforcing elements having a curve of tensile stress as a function of relative elongation with shallow gradients for short elongations and a substantially constant and steep gradient for higher elongations.

12. The tire according to claim 1, wherein the reinforcing elements of at least one layer of circumferential reinforcing elements are metal reinforcing elements that are cut in such a way as to form portions of a length shorter than the circumference of the least long ply, but greater than 0.1 times the circumference, the cuts between portions being axially offset from one another, the elastic modulus in tension per unit width of the additional layer preferably being less than the elastic modulus in tension, measured under the same conditions, of the most extensible working crown layer.

13. The tire according to claim 1, wherein the reinforcing elements of at least one layer of circumferential reinforcing elements are wavy metal reinforcing elements, the ratio $a/\lambda$ of the amplitude of the wave a to the wavelength $\lambda$ being at most equal to 0.09, the elastic modulus in tension per unit width of the additional layer preferably being less than the elastic modulus in tension, measured under the same conditions, of the most extensible working crown layer.

14. A tire with a radial carcass reinforcement comprising a crown reinforcement formed of at least two working crown layers of inextensible reinforcing elements, crossed from one layer to the other making angles of between 10° and 45° with the circumferential direction, itself radially capped by a tread, the tread being connected to two beads via two sidewalls, the crown reinforcement comprising at least one layer of circumferential reinforcing elements distributed axially at a variable pitch, wherein the layer of circumferential reinforcing elements comprises five parts, these being a central part, two intermediate parts and two axially exterior parts, wherein the pitch in the central part is in the range between 1 and 1.5 times the pitch of the axially exterior parts and wherein the pitch in an intermediate part is in the range between 1.6 and 2 times the pitch of the axially exterior parts, wherein the layer of circumferential reinforcing elements is positioned radially between two working crown layers.

15. A tire with a radial carcass reinforcement comprising a crown reinforcement formed of at least two working crown layers of inextensible reinforcing elements, crossed from one layer to the other making angles of between 10° and 45° with the circumferential direction, itself radially capped by a tread, the tread being connected to two beads via two sidewalls, the crown reinforcement comprising at least one layer of circumferential reinforcing elements distributed axially at a variable pitch, wherein the layer of circumferential reinforcing elements comprises five parts, these being a central part, two intermediate parts and two axially exterior parts, wherein the pitch in the central part is in the range between 1 and 1.5 times the pitch of the axially exterior parts and wherein the pitch in an intermediate part is in the range between 1.6 and 2 times the pitch of the axially exterior parts, wherein the axial widths of the working crown layers radially adjacent to the layer of circumferential reinforcing elements are greater than the axial width of the said layer of circumferential reinforcing elements.

* * * * *